May 16, 1939.  G. C. PETERSON  2,158,729
STRAW BUNDLER
Filed June 22, 1937  2 Sheets-Sheet 1

Glen C. Peterson
INVENTOR

BY Victor J. Evans & Co.
ATTORNEYS

May 16, 1939.  G. C. PETERSON  2,158,729
STRAW BUNDLER
Filed June 22, 1937  2 Sheets-Sheet 2
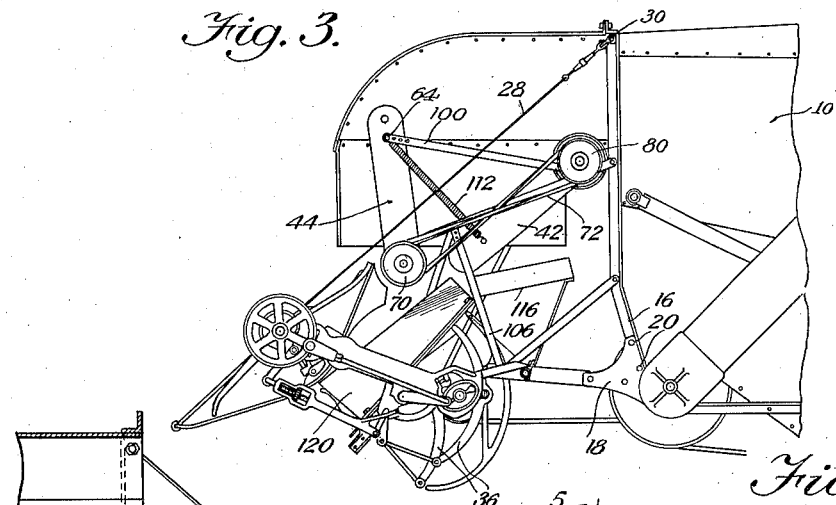
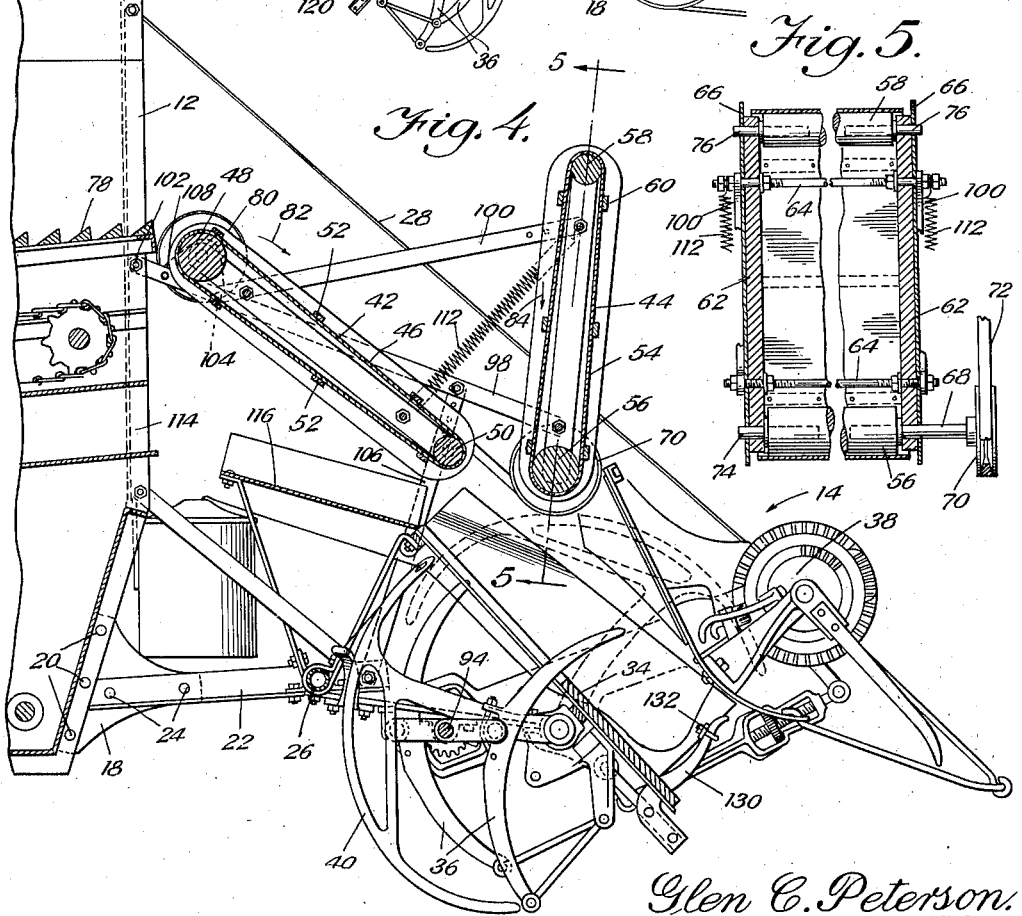
Glen C. Peterson,
INVENTOR
BY Victor J. Evans & Co.
ATTORNEYS Patented May 16, 1939

2,158,729

UNITED STATES PATENT OFFICE 2,158,729

STRAW BUNDLER

Glen C. Peterson, Mokena, Ill.

Application June 22, 1937, Serial No. 149,729

4 Claims. (Cl. 56—471)

My invention relates to combine harvesters, and includes among its objects and advantages the provision of an improved straw bundling attachment.

An object of my invention is to provide a straw bundling device which may be associated with a combine harvester for tying the threshed straw into bundles to facilitate handling and disposal of the straw.

A further object is to provide a bundling device in which novel means is employed for controlling and conditioning the straw as it leaves the combine and delivering the straw to the binding unit.

In the accompanying drawings:

Fig. 3 is a view taken from the position indicated by the line 3—3 of Fig. 2;

Fig. 4 is a sectional view along the line 4—4 of Fig. 2; and

Fig. 5 is a sectional view along the line 5—5 of Fig. 4.

In the embodiment selected to illustrate my invention, I make use of a combine harvester 10 of the type which cuts and threshes the grain. Conventional combines deliver the straw to the field in a loose condition. Much of such straw is saved, and in some cases it is burned, but in either case the problem of disposal is a difficult one because of the loose nature of the material. If the straw is saved it is difficult to handle and is exceedingly bulky in relation to weight. My invention relates to the tying of the straw into bundles before it is dropped on the field. The straw is compacted firmly and tied into bundles of convenient size for handling such as the grain bundles made by conventional binders.

Figure 2:
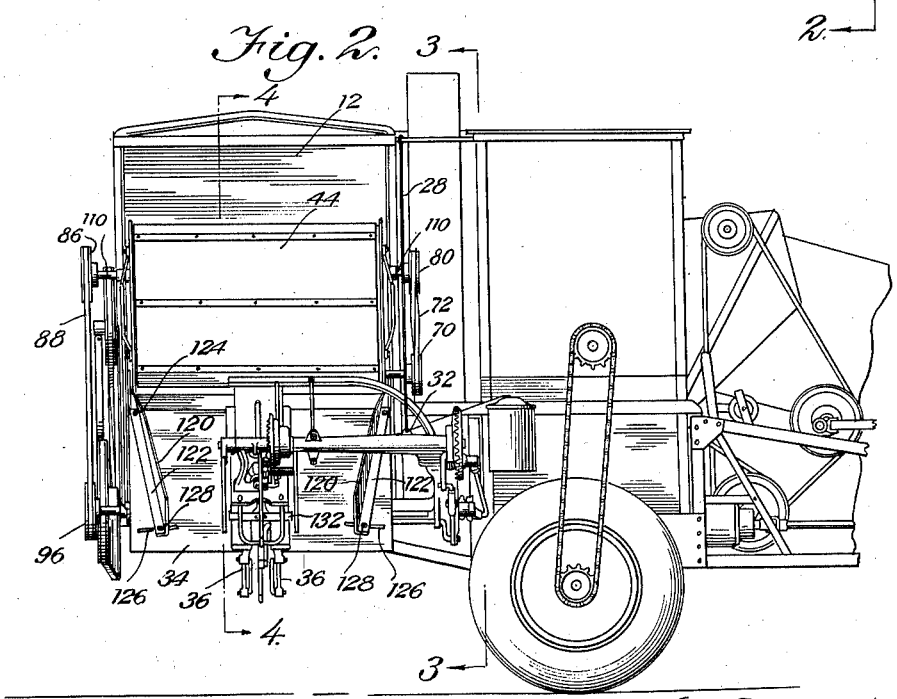
Fig. 2 is a view taken from the position indicated by the line 2—2 of Fig. 1.

In Fig. 4, the straw is discharged laterally from the combine through the opening 12. This straw is delivered to a bundling device 14 which may comprise a standard binder head of the Deering type. The combine 10 includes angle irons 16 on opposite sides, to which angle irons I connect brackets 18 by bolts or rivets 20. Each bracket carries an angle iron 22 attached thereto by bolts or rivets 24, and the angle irons 22 support a shaft 26 to which the bundling device 14 is connected. A load supporting cable or wire 28 has one end connected at 30 by the framework of the combine and its other end is attached to the bundling device or binder head 14 at 32 (see Figs. 2 and 3).

The binder head 14 includes the usual grain supporting board 34, packers 36, and knotter 38. Board 34 is slotted in the usual manner for accommodating the packers 36 and the needle 40. Loose straw as it comes from the combine is bulky and difficult to handle by a conventional binder head for bundling purposes. To facilitate delivery of the straw to the binder head in such condition as to enable the binding mechanism to form the straw into compact sheaves and tie the same, I make use of two straw compacting units 42 and 44. Both units are identical in construction and are so arranged as to receive the straw discharged through the opening 12, press it into a compact mass, and deliver the straw onto the board 34, after which the packers 36 form the straw into compact sheaves. Figs. 4 and 5 illustrate the specific construction of the units 42 and 44.

Unit 42 comprises a canvas 46 running on rollers 48 and 50 and may be provided with slats 52 such as are used in binder canvases. Unit 44 comprises a canvas 54 running on rollers 56 and 58. Canvas 54 also may be provided with slats 60. In Fig. 5, I illustrate the unit 44 as comprising side frame members 62 connected into unitary spaced relation by tie bolts or bars 64. Each member 62 carries a metallic plate 66 longer and wider than its associated frame member, as illustrated in Fig. 4. Roller 56 is provided with a shaft 68 provided with a grooved sheave 70 about which a V-belt 72 operates. Shaft 68 is rotatably supported within an opening in one of the frame members 62 and its associated plate 66, while the opposite end of the roller is provided with a shaft 74 rotatably mounted in the other frame member 62 and its associated plate. Roller 58 is provided with shafts 76 journaled in the frame members 62 and end plates 66 in the same manner as the shafts 68 and 74.

The unit 44 includes the same frame structure as the unit 42. The only difference in the two units resides in the location of the power rollers. In unit 44, the power roller 56 is located at the bottom end of the unit, whereas in the unit 42 the power roller 48 is located at the upper end of the unit in close proximity to the straw rack 78. A grooved sheave 80 is connected with the roller 48 for connection with the V-belt 72 which is twisted in the manner illustrated in Fig. 3.

In operation, the upper reach of the canvas 46 travels in the direction of the arrow 82, while the adjacent reach of the canvas 54 travels in the direction of the arrow 84. To one end of the power roll 48 I connect a sheave 86, which in turn is connected with a V-belt 88 running around a sheave 90 mounted on the main power shaft 92 of the combine. Thus, the sheave 90 drives the roller 48, which in turn drives the roller 56 through the medium of the belt 72.

The packer shaft 94 of the binder head 14 is operatively connected with the belt 58 through the medium of a sheave 96. The frame of the unit 44 is fixedly related to the combine 10. Each side of the unit is fixedly connected with brace bars 98 and 100. Bars 98 are connected with the angle iron 16 at 102, while one end of each bar 100 is connected with its respective bar 98 at 104. To each bar 98 I connect a brace bar 106, which in turn is connected with the angle iron 22 on that side of the machine.

Brace bars 98 carry bearings 108 which rotatably support the shafts 110 connected with the power roll 48. Sheave 86 is connected with one of the shafts 110 (see Fig. 2). Unit 42 may be pivoted about the axes of the shafts 110. I illustrate the lower end of the unit 44 as being connected with two tension springs 112. The upper ends of the springs are connected with the tie bolts 64 of the unit 44 (see Fig. 5). Thus, the unit 42 is adjustable toward and away from the unit 44.

Figure 1:
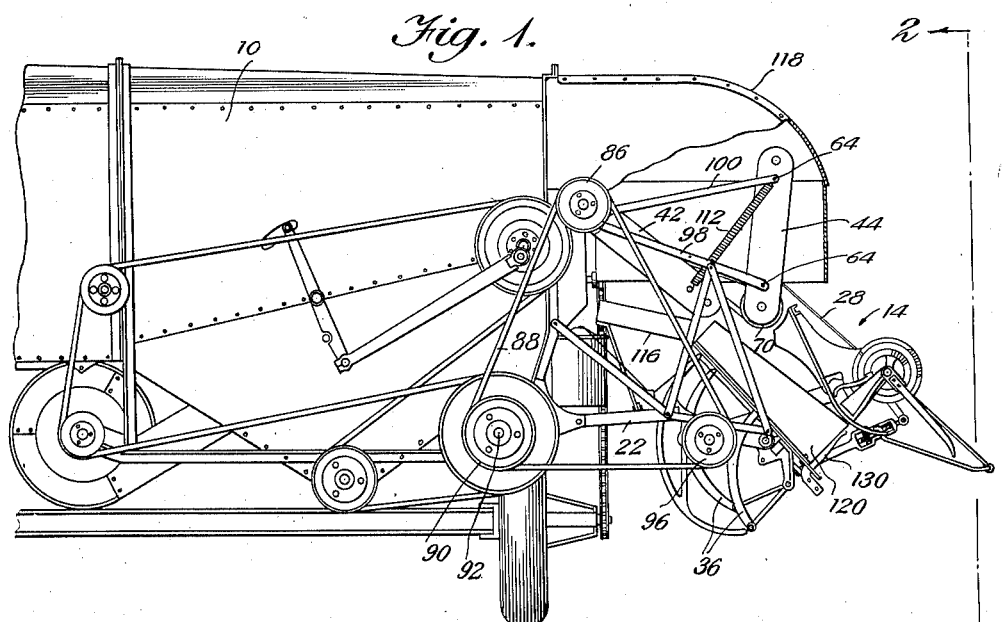
Fig. 1 is an end elevational view of a portion of a combine harvester showing my invention applied thereto.

Chaff is blown from the combine through the outlet 114, which chaff is blown onto a trough 116 which delivers the chaff to the straw delivered to the board 34. In Figs. 1 and 3, I illustrate the combine as being provided with a hood 118 which extends over the units 42 and 44.

On the board 34, I mount two straw deflecting plates 120, which plates include flanges 122 pivotally anchored at 124 to the board. The lower edge of the board is slotted at 126 for the reception of bolts 128 which pass through openings in the flanges 122 for securing the plates 120 in different angular positions. The plates converge in the direction of the trip lever 130 of the binder head 14. This trip is conventional and need not be described in further detail. To the upper end of the trip lever 30, I mount a cross bar 132 which forms additional support for the loose straw as it is being compacted against the lever by the packers 36.

In operation, the straw moves outwardly through the opening 12 and is delivered to the canvas 46 which carries the straw downwardly. The canvas 54 is arranged substantially parallel to the discharge end of the combine and in angular relation with the canvas 46. The lower ends of the canvases 46 and 54 are arranged in close relation so as to compact the straw before it is delivered to the board 34. Because of the springs 112, the lower end of the unit 42 is movably related to the unit 44 so as to provide accommodation for large batches of straw which may be delivered to the units. The straw is delivered to the board 34 in a compacted mass, after which the packers 36 form the straw into compact sheaves. After the sheave of a predetermined size and compactness has been formed, the trip lever 130 is pressed sufficiently far to set the tying mechanism into operation, after which the bundle is tied and thrown out. The bundling and tying mechanism is identical with that of a conventional grain binder, and need not be described in further detail.

My invention is applicable to conventional combines and is so designed as to make use of a conventional binder head. In conventional binder heads the packers 36 each carries a prong on its rear edge at an acute angle to the main reach of the prong. I find it desirable to remove these prongs. In removing the prongs, the upper ends of the packers are devoid of obstructions and irregularities which interfere with the effective handling of material such as straw. According to Fig. 4, the packers each comprises a single curved member shaped to pass through the straw easily and function in such a manner as to effectively compact the straw against the trip lever 130 in such a manner that a solid and well formed straw bundle is made. In other respects, the binder head remains unchanged.

Bars 100 are bored for connection with the upper tie rod 64 while the outer ends of the bars 98 are bored for connection with the lower tie rod 64. Bar 100 is provided with a plurality of openings 132 for selective reception of the ends of the upper tie rod 64 to the end that the unit 44 may be adjusted in various angular positions about the axis of the lower tie rod 64. Similarly, brace bars 106 have their upper ends provided with a plurality of openings 134 for the selective reception of bolts 136 which connect the bars with the bars 98. Because of the openings 134, the unit 44 may be adjusted bodily in a vertical direction so as to secure precise relation between the lower ends of the units 42 and 44 with respect to the board 34 and the packers 36. According to the arrangement of Fig. 4, the unit 44 is so related to the board 34 as to positively move the straw into the zone of the packers.

Some types of combines have the straw discharge outlet at the rear end of the machine while others embody a side discharge such as that illustrated in the drawings. In an installation such as that illustrated, it may be necessary to shift the units 42 and 44 and the binder head to permit the machine to pass through gates and the like. Referring to Fig. 4, the bolts 136 may be unloosened, at which time the unit 44 may be pivoted upwardly against the rear end of the machine about the axis of the bolts 102. Such shifting of the unit 44 will also pivot the unit 44 because of the springs 112. With the units 42 and 44 pivoted and supported in their upper adjustment, access may be had to the sheaves and other parts from the rear end of the combine. At the same time, the binder head or unit 14 may be pivoted upwardly about the axis of the shaft 26 and supported in such position so as to reduce the over-all dimensions of the machine. The bundles are well formed and are easy to handle. The plates 120 may be adjusted to form bundles of different lengths depending upon the nature of the straw as it comes from the combine.

Without further elaboration, the foregoing will so fully explain my invention that others may, by applying current knowledge, readily adapt the same for use under various conditions of service.

I claim:

1. In a device of the type described, a bundling mechanism adapted for association with a thrasher having a straw discharge, two traveling canvases positioned between the straw discharge and the bundling mechanism, one of said traveling canvases being positioned substantially in a vertical plane and the other of said traveling canvases being arranged at an obtuse angle thereto, said traveling canvases being so arranged as to deliver the straw to the bundling mechanism in a compacted mass, and means for operating the canvases.

2. In a device of the type described, a bundling mechanism adapted for association with a thrasher having a straw discharge, two traveling canvases positioned between the straw discharge and the bundling mechanism, one of said traveling canvases being positioned substantially in a vertical plane and the other of said traveling canvases being arranged at an obtuse angle thereto, said traveling canvases being so arranged as to deliver the straw to the bundling mechanism in a compacted mass, and means for operating the canvases, one of said traveling canvases being movably related to the other.

3. In a device of the type described, a bundling mechanism adapted for association with a combine thrasher having a straw discharge, means for supporting the bundling mechanism on the combine thrasher, and thrashed straw compacting means interposed between the straw discharge and the bundling mechanism.

4. In a device of the type described, a bundling mechanism adapted for association with a thrasher having a straw discharge, two travelling endless units positioned between the straw discharge and the bundling mechanism for compacting thrashed straw, one of said units being mounted on a fixed support, the other of said units being mounted on a pivoted support, resilient means interconnecting the units, the pivoted unit yielding to variable straw pressure, to compensate variation in the flow of the straw.

GLEN C. PETERSON.